Patented Aug. 19, 1941

2,253,389

UNITED STATES PATENT OFFICE 2,253,389

JELLY AND MANUFACTURE THEREOF

Nathan M. Mnookin, Kansas City, Mo., assignor to Speas Company

No Drawing. Application July 12, 1938, Serial No. 218,759

21 Claims. (Cl. 99—132)

This invention relates to the manufacture of jellies and of thickening and dispersing agents and more particularly to the utilization of pectin in the production of jellies and of gel structures which are not dependent on the presence of sugar or acid.

In the prior art methods of making jams and jellies or of gel structures by the use of soluble pectin, both sugar and acid, either naturally contained in the fruit juices used or added, are necessary to effect the formation of jams or jellies. The prior art recognizes that soluble pectin forms a gel or gel structure in an aqueous medium only in the presence of acid and of a definite concentration of sugar, although in one instance the use of glycerine is mentioned. I have observed that the characteristic formation of a jelly or gel structure in an aqueous medium containing soluble pectin and acid can also be effected with the aid of the glycols.

With sugar, the minimum concentration in aqueous solution necessary to form a gel with soluble pectin and acid is about 46% when about 2% of acid (as tartaric or citric) is present. Higher concentrations of sugar in the solution, are generally used in forming jellies with soluble pectin and acid, ranging up to as high as 65 to 66% in the case of fruit jellies and up to about 75% in the case of confectionery gels such as gum drops and the like. In these instances the quantity of acid used may be decreased to as low as about 0.2% to 0.1% with increasing quantities of sugar. With concentrations of sugar and acid in the order set forth above, soluble pectin (of a good grade) in the order of about 0.2 to 1% is the usual amount regarded as optimum for jelly production. The proportion will, of course, vary with the jelly grade.

I have now found that jellies or gel structures may be formed from soluble pectin without the aid of acid or of sugar or polyhydric alcohols. Thus, in accordance with my present invention, a jelly or gel structure may be formed by soluble pectin in a substantially neutral or slightly alkaline aqueous medium in the presence of a metal compound capable of yielding, directly or indirectly, an hydroxyl ion in such aqueous medium, with the hydroxyl-ion-yielding compound having limited solubility and insufficient alkalinity in solution to convert the pectin to pectate. The metal compounds which may thus be used are suitably the slightly soluble oxides or hydroxides of the alkaline earth metals. Mixtures capable of forming or yielding such oxides or hydroxides or salts having them present in loosely combined form may also be used. I prefer calcium or other alkaline earth metal saccharate. For edible purposes it is preferable that the calcium compounds be utilized.

The use of sugar in my jellies is not precluded, although in no way a requisite for carrying out the present invention. Thus I have prepared jellies containing sugar ranging in quantities from zero up to about 40%. The larger proportions of sugar are, however, not desirable in jellies or gel structures produced according to the present invention.

In preparing gel structures in accordance with the present invention, the essential ingredients may be incorporated in and mixed with a suitable aqueous vehicle of the proper character as to alkalinity or pH. Preferably, the mixing is carried out at normal room temperatures since substantial heat, under the slightly alkaline condition of the aqueous mix, may tend to cause conversion of the pectin or of part of it to pectate. The use of a slight amount of heat is not objectionable, however, when insufficient to convert the pectin to pectate. The gel structure of the present invention will form and, in the case of jellies, will set at normal room temperatures or on cooling.

A desired condition for securing a gel structure in accordance with my invention may be secured by the use of an alkaline earth metal compound under conditions of slight alkalinity to secure the presence of free hydroxyl ion. I have found that the conditions of alkalinity and of hydroxyl ion concentration (or pH) of a saturated solution of $Ca(OH)_2$ are satisfactory for this purpose, although somewhat less (to a pH of about 7) may be utilized or a somewhat greater alkalinity may be present and still secure a gel structure. The presence of an alkaline earth metal ion is also necessary. Of these I find magnesium the least desirable and prefer not to use it. While other alkaline earth metal ions (or compounds yielding them) may be employed, such as barium and strontium, their use is obviously limited to products not intended as foods. I prefer to employ calcium compounds to yield the alkaline earth metal ion required in accordance herewith.

The required alkaline earth metal ion and the hydroxyl ions may be supplied by use of the slightly soluble hydroxides of the alkaline earth metals, or their soluble salts incorporated with sufficient alkali, as the hydroxides of sodium, potassium, or ammonium, to secure the required alkalinity. Thus I may employ the chlorides, acetates or other salts of the alkaline earth metals in this manner. I have also found that the saccharates of the alkaline earth metals, and particularly calcium saccharate, are advantageous in securing the formation of pectin gels in non-acid media.

In edible products, as hereinbefore stated, I employ the calcium compounds as they are entirely innocuous, and in the further description of my invention, I will refer to the use of calcium compounds primarily. It is to be understood, however, that the invention is not limited thereto and that, for products not intended as foods, the compounds of the other alkaline earth metals may be effectively used.

In commercial distribution, it is usually desirable to have the gel-forming ingredients in a dry mix, which may be distributed and sold as such. The mix is finally dissolved by the purchaser into the water, milk or other neutral or substantially neutral or slightly alkaline aqueous medium, with flavoring materials, sweetening agents, etc. as desired to form the jelly or gel structure. The invention will be described in detail in connection with such dry mixes although it is to be understood that the invention may be carried out by incorporating the same ingredients directly in the aqueous medium, or in parts of it and subsequently mixing the resulting solutions, or in any other desired manner.

The quantities of ingredients in the dry mix may vary rather widely while maintaining relations to secure the desired conditions of alkalinity in the product. Thus, satisfactory results have been obtained by combining about 1 part by weight of soluble pectin of 160 to 190 strength (which is the grade of the pectin herein considered with about 0.2 to about 5 parts by weight of calcium saccharate). Preferably I use about equal parts by weight of pectin and of calcium saccharate. An excess of calcium saccharate in proportion to pectin above the limits set forth above increases the stiffness and graininess of the jell and if sufficiently in excess induces bleeding thereof. Such excess should, of course, be avoided. A substantial decrease of the calcium saccharate in proportion to the pectin below the limits set forth above will render the mix incapable of producing the jell. Where sugar is used the proportion of calcium saccharate in respect of the pectin may be decreased to about two-thirds the amount of calcium saccharate hereinabove set forth when say about 40% of sugar is used, and to a less extent with smaller proportions of sugar.

In producing jellies with the above or other dry mixes in accordance with my invention, the powder mix containing 1 part by weight of pectin either without sugar or with the desired amount of sugar is dissolved in about 100 parts by weight of water, milk or like aqueous media. In the case of milk, skim milk or similar products, the acidity thereof may require compensation by alkali to secure the desired conditions of alkalinity. The solution may then be poured into a mold and permitted to stand until a jelly or gel structure results. The proportion of water or of milk to the dry mix may be increased, if desired. With aqueous media or water, for example, I have obtained jellies using as much as 600 parts by weight to one part of a pectin.

The constituents of the dry powder mix above referred to may be incorporated in the aqueous vehicle to secure a gel structure in any desired way; for example, they may be dissolved in separate portions of the aqueous vehicle, with or without heating, and subsequently mixed, preferably while cool.

Instead of calcium saccharate, as hereinbefore set forth, I may use the slightly soluble alkaline earth metal hydroxides such as calcium hydroxide, barium hydroxide and the like or an equivalent quantity of the corresponding oxides to supply the required alkaline earth metal ions and the hydroxyl ions in the aqueous medium. These may be dissolved in water or the aqueous vehicle (a saturated solution of $Ca(OH)_2$, for example, providing a suitable alkalinity), and pectin then dissolved to provide 1 part of pectin to 50 to 600 parts by weight of vehicle.

The required conditions may also be secured by the use of a soluble alkaline earth metal salt in an alkaline aqueous medium. Thus, I have produced jellies or gel structures in accordance with my invention by adding about 0.2 part by weight of calcium acetate and about 0.25 part by weight of pectin (190 strength) to about 100 parts by weight of water which has been rendered slightly alkaline by the addition of about 0.2 to 0.3 up to about 2.5 parts by weight of N sodium hydroxide solution. The calcium acetate and the pectin and even the alkali may be mixed in dry form and the mix added to the aqueous medium to form the jelly or gel structure. To this solution, regardless of the manner formed, may be added, if desired, up to about 25 parts by weight of sugar.

Instead of calcium acetate, I may use calcium lactate, calcium chloride or like soluble alkaline earth metal salts. Instead of sodium hydroxide, ammonium hydroxide, potassium hydroxide and like bases may be used. As pointed out hereinbefore, care must be exercised in regulating the quantity of alkali used since the resulting solution must not have an alkalinity sufficient to convert the pectin to pectate. An excess of alkali over the amount effective in producing a jelly or a gel structure in accordance with my invention, or of the alkaline earth metal salt, and particularly the metal and the content thereof, is to be avoided since the hardness and graininess of the resulting jell or gel structure is thereby increased. In general, with solutions of higher pH, within the limits set forth, correspondingly smaller amounts of alkaline earth metal salt may be used. The alkaline earth metal salt and the alkali should not, however, be used in such small amounts as to seriously delay the time of set of the jell.

In general, the jellies or gel structures produced in accordance with the present invention are resilient and clear and are not as sensitive to temperature changes as are those of the gelatine or jello-type. These jellies or gels hold their shape under normal weather conditions without the necessity of being kept cool. While cooling to maintain the shape of the jelly or gel is desirable, it is not, however, essential. The jellies or gels are odorless and may be readily removed from the mold without heating and/or cooling. They may be compounded with coloring and flavoring materials (if non-acid) in the same manner as now employed with gelatin desserts. Obviously, the coloring and flavoring materials, if desired, may be incorporated with the ingredients constituting the dry mix.

The presence of certain alkali metal salts in the gel-forming solution, which salts by the way may also be included as an ingredient in a dry mix, is desirable for the purpose of delaying the time of set of the jellies or gel produced in accordance with my invention and of increasing their internal strength and texture. In most instances, about 0.02 to 0.3% and generally about 0.1% by weight of such salt in the gel-forming solution is suitable for these purposes although the quantity of the soluble salt or salts may be varied, as desired, to meet any desired need. As examples of such salts, I may use the alkali metal (including NH4) salts of weak acids, such as sodium citrate, ammonium citrate, the corresponding tartrates, acetates, lactates and the like, hexametaphosphates, sodium di-ammonium phosphate, potassium ammonium phosphate and the like, or mixtures thereof.

In connection with the control of the gel-forming characteristics of a product in accordance with my invention, it may be noted that increase in proportions of pectin or of alkaline earth metal compounds, or of sugar (if used), increases gel-formation, accelerating the production of jellies or gels or increasing the firmness thereof, whereas the alkali metal salts act in the reverse direction. Thus, in controlling the characteristics of the products, if the amount of an ingredient of the gel-forming type is to be increased, the effect of so doing may be counterbalanced by decreasing the proportions of others of the same group or by increasing the proportion of the alkali metal salts used, and vice versa. It is, of course, obvious from the foregoing that the proportions of ingredients may be varied to meet any desired need in strength, resilience, clarity, grain, sugar content and the like in jellies or gels. It may also be noted that the color of a product produced in accordance with my invention may be governed, at least to some extent, by the type of pectin used. Thus, with the aid of lemon pectin, jellies, and particularly edible jellies, of better color are obtained. The invention is particularly adapted to the production of non-sugar or low sugar edible jellies or jelled foods in which the absence of animal gelatins or other animal products is desired.

I have directed the above description of my invention to the preparation of jellies or gels. I also employ the invention in securing a gel structure for the purpose of securing thickening, smoothness, or more effective dispersion in liquids, particularly food products. Thus, for example, my invention may be utilized for thickening milk products, particularly when fresh, as well as other non-acid aqueous media. For these purposes the gel-forming ingredients described above are used in slightly less amounts than in the preparation of jellies. I have also found that the gel-forming ingredients employed in accordance with my invention may be incorporated, in relatively small amounts, in milk powders, cream powders, special milk preparations, chocolate malted milk, ice cream mixes, cheese and the like, for example in amounts to provide one-tenth to one-half the proportions necessary to produce a firm gel as hereinbefore set forth, and they function therein as dispersing or smoothing agents to effect the uniform distribution of the milk powder or secure smoothness in an aqueous medium.

Where proportions of pectin have been referred to herein, they are based upon a grade of jelly strength of 160 to 190. It will be understood that with pectins of other strengths, the proportions are to be modified accordingly. Thus, with a 100 grade pectin which is usually considered standard, proportionately lesser amounts may be used.

By the expression "stable, pectin-gelled products" as used in the claims, I mean not only a jelly but a liquid product containing the gel-forming ingredients in slightly less amounts than is used in the preparation of the jellies.

I claim:

1. Milk powder containing therein pectin and calcium saccharate.

2. Milk powder containing therein pectin, a calcium salt and an alkali sufficient to form calcium hydroxide therewith in an amount sufficient to render a substantially neutral aqueous dispersion of the milk powder slightly alkaline, but insufficient to convert the pectin to pectate.

3. Milk powder containing therein pectin and a calcium hydroxide compound, the quantity of said compound being sufficient to render a substantially neutral liquid slightly alkaline when the mixture is introduced into said liquid, but insufficient to convert the pectin to pectate.

4. A powdered material containing therein pectin and calcium saccharate.

5. A powdered material containing therein pectin and a calcium hydroxide compound, the quantity of said compound being sufficient to render a substantially neutral liquid slightly alkaline when the mixture is introduced into said liquid, but insufficient to convert the pectin to pectate.

6. The method of gelling an aqueous liquid with pectin to form a slightly alkaline, stable, pectin-gelled product, comprising reacting an alkaline earth metal compound capable of yielding an alkaline earth metal ion and an hydroxyl ion in an aqueous liquid with soluble pectin in the aqueous liquid, the said metal compound being present in an amount at least sufficient to produce in the final product a pH above 7, but insufficient to convert the pectin to pectate.

7. The method of gelling an aqueous liquid with pectin to form a slightly alkaline, stable, pectin-gelled product, comprising reacting an alkaline earth metal compound capable of yielding an alkaline earth metal ion and an hydroxyl ion in the aqueous liquid with soluble pectin while maintaining the pH of the liquid above 7 but below the point where the pectin will be converted to pectate, the said metal compound being present in an amount insufficient to convert the pectin to pectate.

8. The method of gelling an aqueous liquid with pectin to form a slightly alkaline, stable, pectin-gelled product, comprising introducing soluble pectin and a soluble alkaline earth metal salt in an aqueous liquid having an alkalinity sufficient to produce in the final product a pH above 7, but insufficient to convert the pectin to pectate.

9. The method of gelling an aqueous liquid with pectin to form a slightly alkaline, stable, pectin-gelled product, comprising reacting pectin and calcium saccharate in the aqueous liquid while maintaining the pH of the liquid above 7.

10. The method of gelling an aqueous liquid with pectin to form a slightly alkaline, stable, pectin-gelled product, comprising reacting pectin and a calcium hydroxide compound in the aqueous liquid while maintaining the pH of the liquid above 7, the amount of said hydroxide being sufficient to produce in the final product a pH above 7, but insufficient to convert the pectin to pectate.

11. The method of gelling an aqueous liquid with pectin to form a slightly alkaline, stable, pectin-gelled product, comprising reacting pectin, calcium acetate and sodium hydroxide in an aqueous liquid, the amount of the said hydroxide being sufficient to produce in the final product a pH above 7, but insufficient to convert the pectin to pectate.

12. As a new article of manufacture, a continuous, stable, pectin jelly having a pH above 7, the jelly-forming ingredients being pectin and calcium saccharate.

13. As a new article of manufacture, a continuous, stable, pectin jelly having a pH above 7 and containing an alkali metal salt of a weak acid, the jelly-forming ingredients being pectin and calcium saccharate.

14. As a new article of manufacture, a continuous, stable, pectin jelly having a pH above 7, the jelly-forming ingredients being pectin and an alkaline earth metal hydroxide in an amount insufficient to convert the pectin to pectate.

15. As a new article of manufacture, a continuous, stable, pectin jelly having a pH above 7 and containing an alkali metal salt of a weak acid, the jelly-forming ingredients being pectin and a calcium hydroxide compound in an amount insufficient to convert the pectin to pectate.

16. As a new article of manufacture, a continuous, stable, pectin jelly free from acid and sugar and having a pH above 7, the jelly-forming ingredients being pectin and an alkaline earth metal hydroxide in an amount insufficient to convert the pectin to pectate.

17. As a new article of manufacture, an edible milk product thickened with gel-forming ingredients comprising pectin and calcium saccharate, said thickened product being in liquid form and having a pH above 7 but below the point where the pectin will be converted to pectate.

18. As a new article of manufacture, an edible milk product thickened with gel-forming ingredients comprising pectin and an alkaline earth metal hydroxide in an amount insufficient to convert the pectin to pectate, said thickened product being in liquid form and having a pH above 7 but below the point where the pectin will be converted to pectate.

19. As a new article of manufacture, an aqueous liquid product thickened with gel-forming ingredients comprising pectin and calcium saccharate, said thickened product being in liquid form and having a pH above 7 but below the point where the pectin will be converted to pectate.

20. As a new article of manufacture, an edible milk product thickened with gel-forming ingredients comprising pectin and a calcium hydroxide compound, said thickened product being in liquid form and having a pH above 7 but below the point where the pectin will be converted to pectate.

21. A dry mix capable of forming a strong, firm, stable jelly having a pH above 7 when introduced into a substantially neutral liquid, comprising pectin and calcium saccharate.

NATHAN M. MNOOKIN.